United States Patent [19]
Kido et al.

[11] Patent Number: 5,412,302
[45] Date of Patent: May 2, 1995

[54] ROTARY BODY DRIVE CONTROL APPARATUS CAPABLE OF COMPENSATING FOR VARIATIONS OF TRANSFER CHARACTERISTICS

[75] Inventors: Mamoru Kido; Kenji Kanzaki; Noribumi Sato; Minoru Kasama; Tosio Anzai, all of Kanagawa, Japan

[73] Assignee: Fuji Xerox Co., Ltd., Tokyo, Japan

[21] Appl. No.: 137,770

[22] Filed: Oct. 19, 1993

[30] Foreign Application Priority Data

Dec. 1, 1992 [JP] Japan .................. 4-322076

[51] Int. Cl.$^6$ .............................. H02P 5/00; H02P 8/00
[52] U.S. Cl. ................................. 318/685; 318/254; 318/268; 318/632
[58] Field of Search ............. 318/685, 696, 138, 254, 318/439, 611, 619, 652, 602, 268, 632; 388/901, 907.5

[56] References Cited

U.S. PATENT DOCUMENTS

| | | | |
|---|---|---|---|
| 4,882,526 | 11/1989 | Iino et al. | 318/561 |
| 4,891,588 | 1/1990 | Fujioka et al. | 324/166 |
| 5,055,756 | 10/1991 | Ohkoda et al. | 318/618 |
| 5,172,312 | 12/1992 | Iino et al. | 364/149 |

FOREIGN PATENT DOCUMENTS

| | | |
|---|---|---|
| 58-66589 | 4/1983 | Japan . |
| 63-75759 | 4/1988 | Japan . |
| 2-43574 | 2/1990 | Japan . |

*Primary Examiner*—Bentsu Ro
*Attorney, Agent, or Firm*—Finnegan, Henderson, Farabow, Garrett & Dunner

[57] ABSTRACT

A rotation control system includes a motor for driving a rotary body, a rotary encoder for detecting angular velocity of the rotary body, a CPU for controlling angular velocity of the motor via an interval counter and a motor driver based on the detected angular velocity of the rotary body. The CPU determines a transfer function of the rotation control system and then calculates gain and phase margins based on the transfer function. The CPU selects the most appropriate values of control parameters from preset values stored in a ROM when the gain or phase margin is out of a predetermined range.

6 Claims, 11 Drawing Sheets

| N |
|---|
| 60 |
| 90 |
| 120 |
| 180 |
| 240 |
| 360 |
| 720 |

FIG. 12(b)

| p |
|---|
| 1 |
| 3 |
| 5 |
| 11 |
| 12 |
| 41 |

FIG. 12(c)

| β |
|---|
| 1/2 |
| 1/4 |
| 1/8 |
| 1/16 |

ROTARY BODY DRIVE CONTROL APPARATUS CAPABLE OF COMPENSATING FOR VARIATIONS OF TRANSFER CHARACTERISTICS

BACKGROUND OF THE INVENTION

The present invention relates to a rotary body drive control apparatus used in an image forming apparatus such as a color electrophotographic copier and a color printer to control the drive of a rotary body such as a photoreceptor drum and a transfer drum.

For example, in a tandem-type color electrophotographic copier, a plurality of recording sections are sequentially arranged along a conveying path of a recording sheet that is conveyed by a transfer belt. Each recording section consists of a drum-shaped latent image carrying body, a developer for developing the latent image on the image carrying body with toner, a transfer device for transferring the toner image from the image carrying body to the recording sheet, and other devices. In the respective recording sections, toner images of different colors are transferred, i.e., superimposed onto the recording sheet being conveyed by the transfer belt. To correctly transfer the toner image onto the recording sheet at a predetermined position, it is necessary that the transfer belt be moved at a constant speed and the drum-shaped image carrying body be rotated at a constant angular velocity. To this end, the angular velocity of the image carrying body is detected and the rotation of a motor (rotational drive source) is controlled so that the angular velocity of the image carrying body is kept constant.

For example, Japanese Patent Application Unexamined Publication No. Sho. 63-75759 discloses a conventional rotary body drive control apparatus of the above type. This drive control apparatus for an image carrying body is used in an image forming apparatus that forms an image on a moving endless image carrying body, and has a step motor for driving the image carrying body through an image carrying body moving mechanism that is a reduction gear train having an integer-to-integer gear ratio, a memory for storing a one-rotation pulse generation pattern for canceling out a rotational variation in one rotation of the final stage gear of the gear train, and a means for detecting a home position of the final stage gear. While the image carrying body is moved, the step motor is driven with pulses being generated based on the stored pulse generation pattern.

In the drive control apparatus for the image carrying body disclosed in the above publication, the pulse generation pattern for canceling out the rotational variation of the image carrying body is stored in advance in the memory as a fixed pattern. The rotational variation of the image carrying body is prevented by driving the step motor using the pulses generated based on the fixed pulse generation pattern stored in the memory. However, the fixed pulse generation pattern cannot accommodate an unexpected change of the rotation states of the reduction gear train as would be caused by environmental variations such as a temperature variation, long-term use, etc. Therefore, the rotational variation of the image carrying body as would be caused by environmental variations or long-term use cannot be suppressed properly, and the residual rotational variation of the image carrying body will cause a color registration error, pitch unevenness (banding), etc.

To solve the above problem, there was proposed a rotation control method and apparatus in a multiple transfer apparatus (Japanese Patent Application Unexamined Publication No. Hei. 2-43574). According to this rotation control method in a multiple transfer apparatus in which a plurality of images are multiple-transferred onto a common transfer roller, information on the angular velocity variation of the transfer roller when a motor for driving the transfer roller is rotated at a constant angular velocity is stored in advance in a memory means. In the transfer operation, the angular velocity of the motor is adjusted based on the information on the angular velocity variation that is read from the memory means. Further, to accommodate the angular velocity variation of the transfer roller due to environmental variations or long-term use, an angular velocity signal from an encoder that is associated with the transfer roller is used. In this manner, the variation components are corrected. That is, the feedforward control and the feedback control are combined in this method to correctly register images of the respective colors onto a recording sheet.

According to the above rotation control method, the additional rotational variation of the image carrying body due to environmental variations or long-term use can be corrected as part of the variation components in adjusting the angular velocity of the motor based on the information on the angular velocity variation of the transfer roller that is read from the memory means and the correction information that is obtained on a realtime basis. Thus, this rotation control method can accommodate the rotational variation due to environmental variations, long-term use, etc.

However, the above conventional technique is still associated with the following problems. That is, in the above rotation control method, the information on the angular velocity variation itself of the transfer roller is stored in the memory means, and the angular velocity of the motor is directly adjusted based on the information read from the memory means. If it is intended to improve the accuracy of the rotation control of the transfer roller by greatly increasing the number of divided sections for the angular velocity detection, the variation component by the correction may gradually increase to become a vibration source with respect to a system from the motor to the rotation shaft of the transfer roller via gears. This may cause an oscillation or increase the amplitude of a vibration at the characteristic frequency of the system. Further, since in this case (that is, when it is intended to improve the accuracy of the rotation control of the transfer roller) it is necessary to use a highly accurate encoder to detect the angular velocity variation of the transfer roller, the cost increases as much.

Another publication Japanese Patent Application Unexamined Publication No. Sho. 58-66589 discloses a technique of stabilizing the rotation of an electrically driven motor by performing adaptive prediction type automatic control while detecting variations of the rotational phase and speed of the motor.

This technique can control the frequency itself that depends on the rotation cycle of the motor. However, for instance when the motor is used as a direct motor, that is, in the case of control in a relatively low frequency band, there is no gain for an angular velocity in a frequency band higher than that of the intended control. Therefore, there may occur a color registration error and banding.

SUMMARY OF THE INVENTION

An object of the present invention is to minimize a deterioration of rotation accuracy due to variations in a control system for controlling the rotation speed of a rotary body.

According to the invention, an apparatus for controlling drive of a rotary body used in an image forming apparatus comprises:

- a drive source for rotationally driving the rotary body;
- means for detecting an angular velocity of the rotary body;
- rotation control means for controlling an angular velocity of the drive source based on the detected angular velocity of the rotary body;
- means for determining a transfer function of the rotation control means;
- means for determining a gain margin and a phase margin from the transfer function; and
- means for changing a control parameter of the rotation control means when the gain margin or the phase margin is out of a predetermined range.

DESCRIPTION OF THE PREFERRED EMBODIMENT

With reference to the accompanying drawings, the present invention is described hereinafter based on an embodiment.

Figure 1:
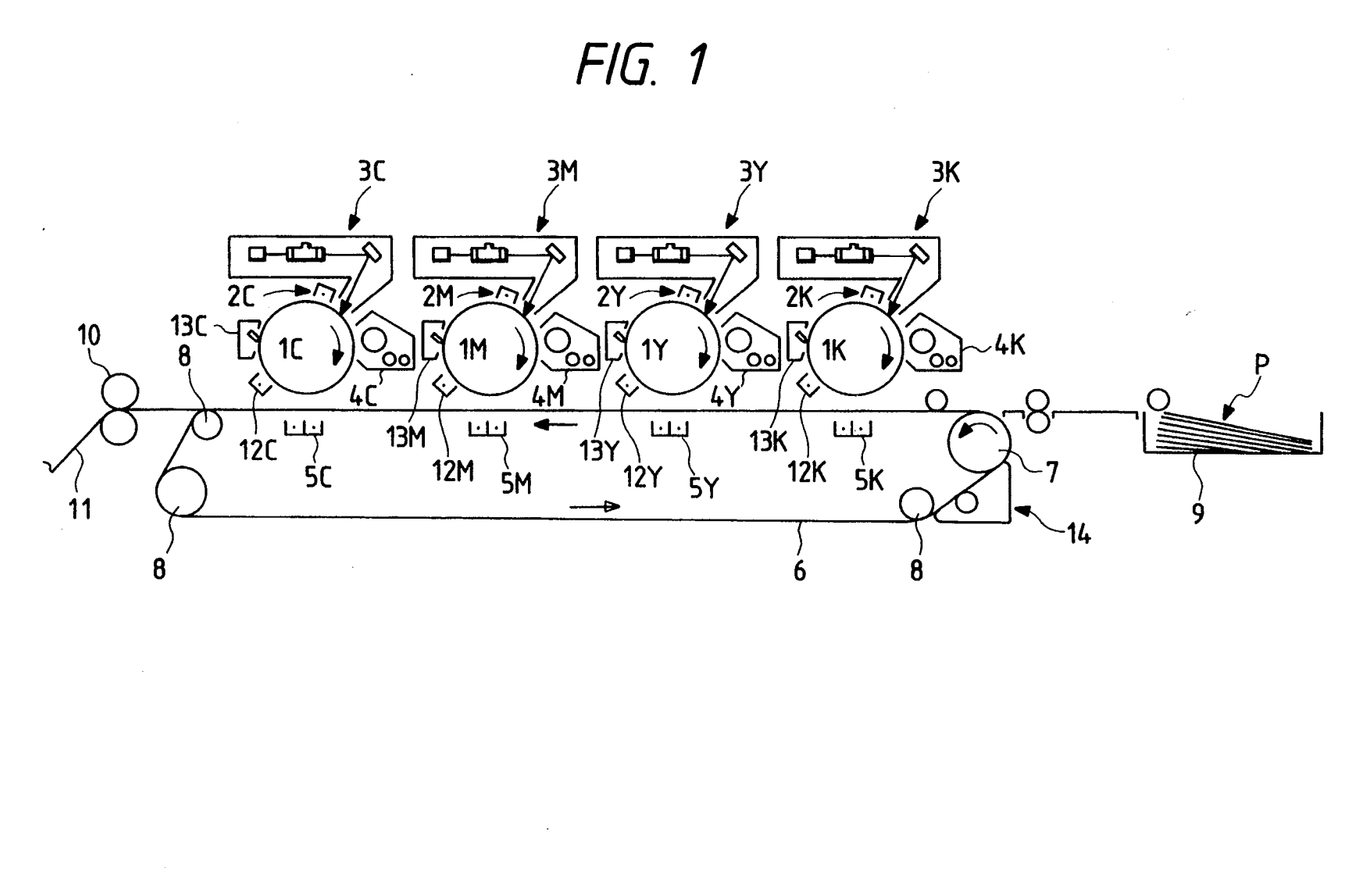
FIG. 1 schematically shows a structure of a tandem-type color image forming apparatus to which the present invention is applied.

FIG. 1 schematically shows a structure of a tandem-type color image forming apparatus to which the invention is applied.

In FIG. 1, symbols 1K, 1Y, 1M and 1C denote photoreceptor drums on the surfaces of which toner images of black, yellow, magenta and cyan are to be formed, respectively. The photoreceptor drums 1K, 1Y, 1M and 1C are sequentially arranged along a sheet conveying path at predetermined intervals. After the surfaces of the photoreceptor drums 1K, 1Y, 1M and 1C are uniformly charged by primary chargers 2K, 2Y, 2M and 2C, electrostatic latent images are formed on those surfaces while the images are sequentially written by exposure optical systems 3K, 3Y, 3M and 3C each consisting of a semiconductor laser, polygon mirror, etc. The electrostatic latent images on the photoreceptor drums 1K, 1Y, 1M and 1C are developed with toners of black, yellow, magenta and cyan, respectively to become visible toner images, which are sequentially charge-transferred onto a sheet P by transfer chargers 5K, 5Y, 5M and 5C.

A conveyer belt 6 for the sheet P, which is engaged with a drive roller 7 and a plurality of idler rollers 8, is rotationally driven in the direction indicated by arrows. The sheet P, onto which toner images are to be sequentially transferred from the photoreceptor drums 1K, 1Y, 1M and 1C, is supplied from a sheet feeding cassette 9, conveyed by the conveyer belt 6 while being held thereon electrostatically, and in turn carried to respective transfer positions below the photoreceptor drums 1K, 1Y, 1M and 1C. The sheet P onto which the toner images have been transferred from the respective photoreceptor drums 1K, 1Y, 1M and 1C is separated from the conveyer belt 6 and sent to a fusing unit 10. After a color image is fused to the sheet P in the fusing unit 10, the sheet P is output to a discharge tray 11.

On the other hand, after the transfer of the toner images, the surfaces of the photoreceptor drums 1K, 1Y, 1M and 1C are discharged by discharging devices 12K, 12Y, 12M and 12C and residual toners etc. are removed from those surfaces by cleaning devices 13K, 13Y, 13M and 13C, to prepare for the next image forming operation. Numeral 14 denotes a belt cleaning unit for cleaning the surface of the conveyer belt 6.

Figure 2:
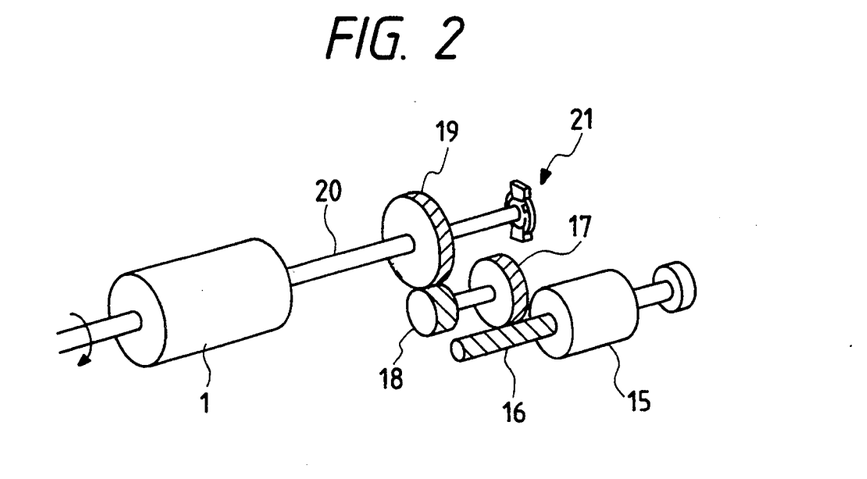
FIG. 2 is a perspective view of a photoreceptor drum drive mechanism used in the color image forming apparatus of FIG. 1.

FIG. 2 is a perspective view schematically showing a drive mechanism for rotationally driving the photoreceptor drum. Since the respective drive mechanisms for the photoreceptor drums 1K, 1Y, 1M and 1C have the same structure, the drive mechanism for one of the photoreceptor drums is described below with reference to FIG. 2.

In FIG. 2, numeral 1 representatively denotes the photoreceptor drum 1K, 1Y, 1M or 1C, and is rotationally driven by a mechanism consisting of a step motor 15, a first gear 16 having teeth formed on a drive shaft itself of the motor 15, a second gear 17 engaged with the first gear 15, a third gear 18 fixed to a shaft of the second gear 17, and a photoreceptor gear 19 fixed to a rotary shaft 20 of the photoreceptor drum 1 and engaged with the third gear 18. A rotary encoder 21 is attached to the rotary shaft 20 of the photoreceptor drum 1.

Figure 3:
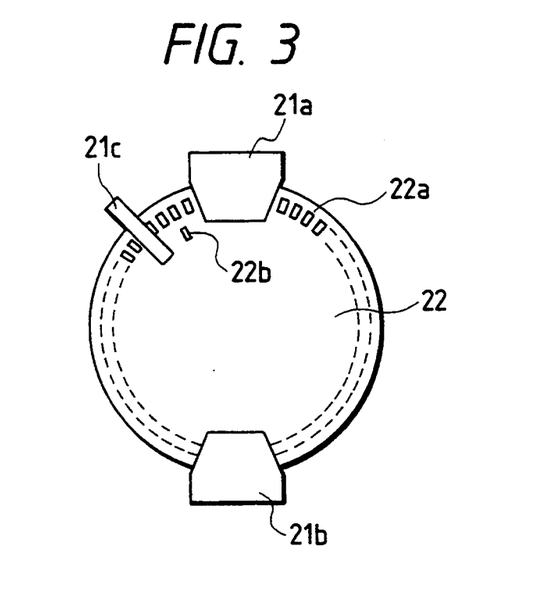
FIG. 3 is a side view of a rotary encoder used in the drive mechanism of FIG. 2.

As shown in FIG. 3, the rotary encoder 21 consists of a metal code wheel (disk) having 360, for instance, of angular velocity detecting windows 22a formed equidistantly on a concentric circle in the vicinity of the outer periphery and one reference position detecting window 22b formed on a circle whose radius is different from that of the circle of the windows 22a, a pair of sensor modules 21a and 21b disposed symmetrically with respect to the rotation axis for detecting passage of the angular velocity detecting windows 22a, and a sensor module 21c for detecting passage of the reference position detecting window 22b. The width in the circumferential direction of each angular velocity detecting window 22a is set equal to the interval between the adjacent angular velocity detecting windows 22a, but the invention is not limited to such a case. The angular velocity detecting windows 22a and the reference position detecting window 22b of the metal code wheel 22 are formed by etching a metal disk through a mask having a window pattern.

Figure 4:
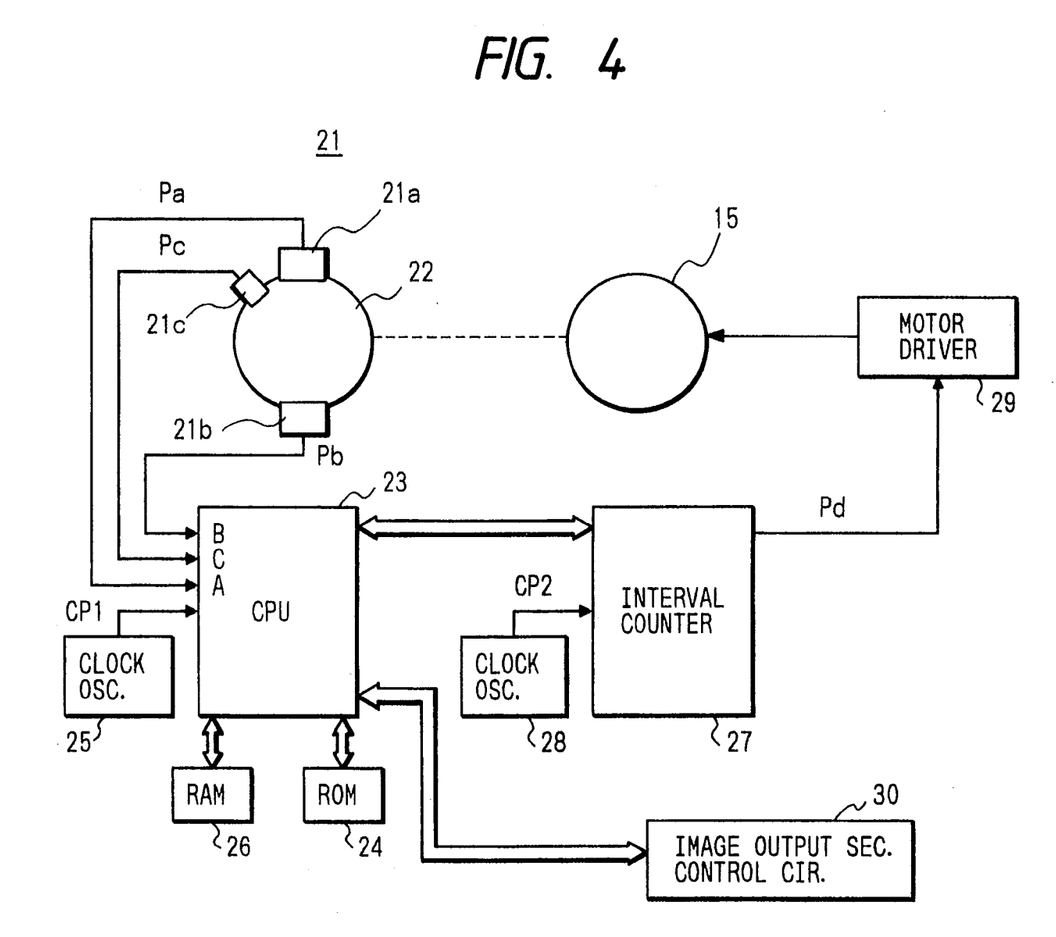
FIG. 4 is a block diagram showing a rotary body drive control apparatus in the color image forming apparatus of FIG. 1.

FIG. 4 is a block diagram showing constitution of a control section for controlling the rotation of the photoreceptor drum driving motor.

The sensor modules 21a and 21b of the rotary encoder 21 produce 360 pulses Pa and Pb per one rotation, and the sensor module 21c produces one pulse Pc per one rotation.

In FIG. 4, a CPU 23 controls the rotation of the motor 15 in accordance with the rotation state of the photoreceptor drum 1 detected by the rotary encoder 21. A ROM 24 stores programs to be executed by the CPU 23 and preset data such as look-up tables of control parameters (described later). A clock oscillator 25 generates clock pulses CP1 to be used for the detection of time intervals between the pulses Pa and between the pulses Pb that are output from the rotary encoder 21. A RAM 26 stores, for instance, data of time intervals for respective divided sections that are sent from the rotary encoder 21. An interval counter 27 counts pulses CP2 sent from a clock oscillator 28 and outputs a drive pulse Pd every time the count reaches a predetermined number instructed by the CPU 23. Thus, the drive pulses Pd are output at an instruction frequency. A motor driver 29 rotationally drives the motor 15 based on the drive pulses Pd sent from the interval counter 27. An image output section control circuit 30 controls the operation of the entire image output section including the CPU 23. In FIG. 4, a power transmission system including gears is interposed between the motor 15 and the rotary encoder 21.

Figure 5A:
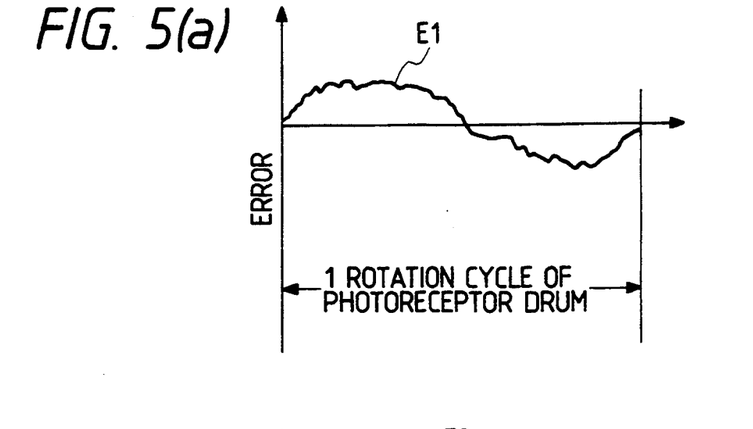
FIGS. 5(a)–5(c) are waveform diagrams showing a positional error of a photoreceptor drum and a detection error of the rotary encoder.
Figure 5B:
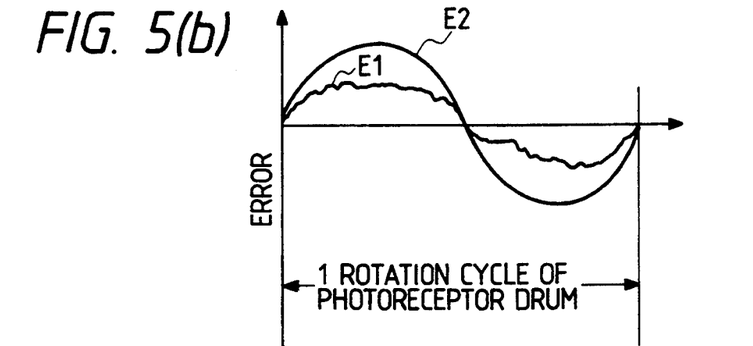
Figure 5C:
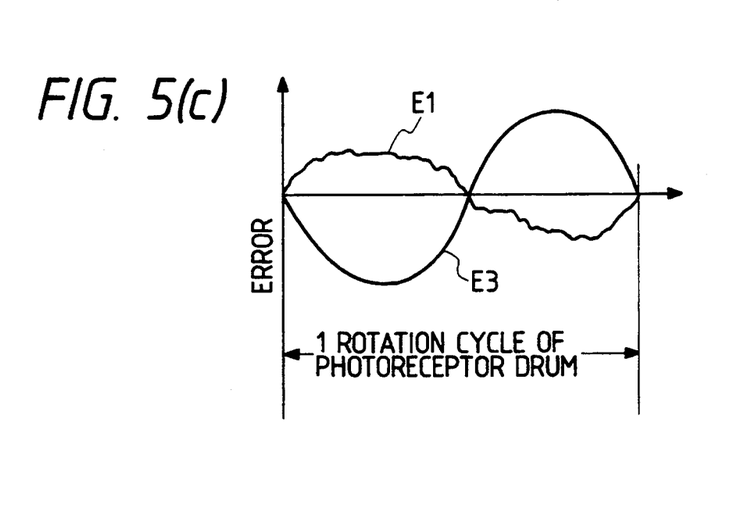

In the color image forming apparatus described above, even with a constant instruction frequency for the motor 15 that rotationally drives the photoreceptor drum 1, a positional error (deviation from the ideal position) E1 that is associated with the angular velocity variation of the shaft 20 of the photoreceptor drum 1 would appear as shown in FIG. 5(a) in the rotation of the photoreceptor drum 1 owing to the eccentricity of the rotary shaft 20 of the photoreceptor drum 1, engaging errors between the drive gears 16–19 (see FIG. 2), and other factors. To solve this problem, as described above, the rotation of the motor 15 is controlled so that the angular velocity becomes constant while it is detected by the rotary encoder 21 attached to the rotary shaft 20 of the photoreceptor drum 1. However, the rotary encoder 21 not always detects the angular velocity in a correct manner. In particular, if the rotary encoder 21 of the metal code wheel type is employed to reduce the cost, a detection error E2 (see FIG. 5(b)) of the rotary encoder 21 is large. To facilitate the understanding, the errors are exaggerated in FIGS. 5(a)–5(c). The detection error E2 is not random but changes periodically with a cycle equal to the rotation cycle of the rotary shaft 20 of the photoreceptor drum 1. Further, since the sensor modules 21a and 21b are arranged symmetrically with respect to the rotary shaft 20, if, for instance, the sensor module 21a detects the error E2 as shown in FIG. 5(b), the sensor module 21b detects an error E3 (see FIG. 5(c)) having the same amplitude as and the reversed phase with the error E2. On the other hand, the sensor modules 21a and 21b detect the positional error E1, i.e., the angular velocity variation of the rotary shaft 20 of the photoreceptor drum 1 as having the same phase.

Considering the above, in the embodiment, the outputs of the rotary encoders 21a and 21b are added together and then divided by two to eliminate their detection errors and extract the true angular velocity error of the rotary shaft 20 of the photoreceptor drum 1. The rotation of the motor 15 is controlled based on the true error thus extracted.

The rotation control on the motor 15 is described below in detail.

To start forming a color image, the CPU 23 instructs the interval counter 27 to output the drive pulses Pd at a standard frequency $f_0$. The interval counter 27 counts the pulses CP2 sent from the clock oscillator 28 and outputs the drive pulse Pd every time the count reaches the value corresponding to the standard frequency $f_0$. As a result, the photoreceptor drum 1 is rotationally driven by the drive pulses Pd of the frequency $f_0$ that are supplied to the motor 15 via the motor driver 29.

Figure 6:
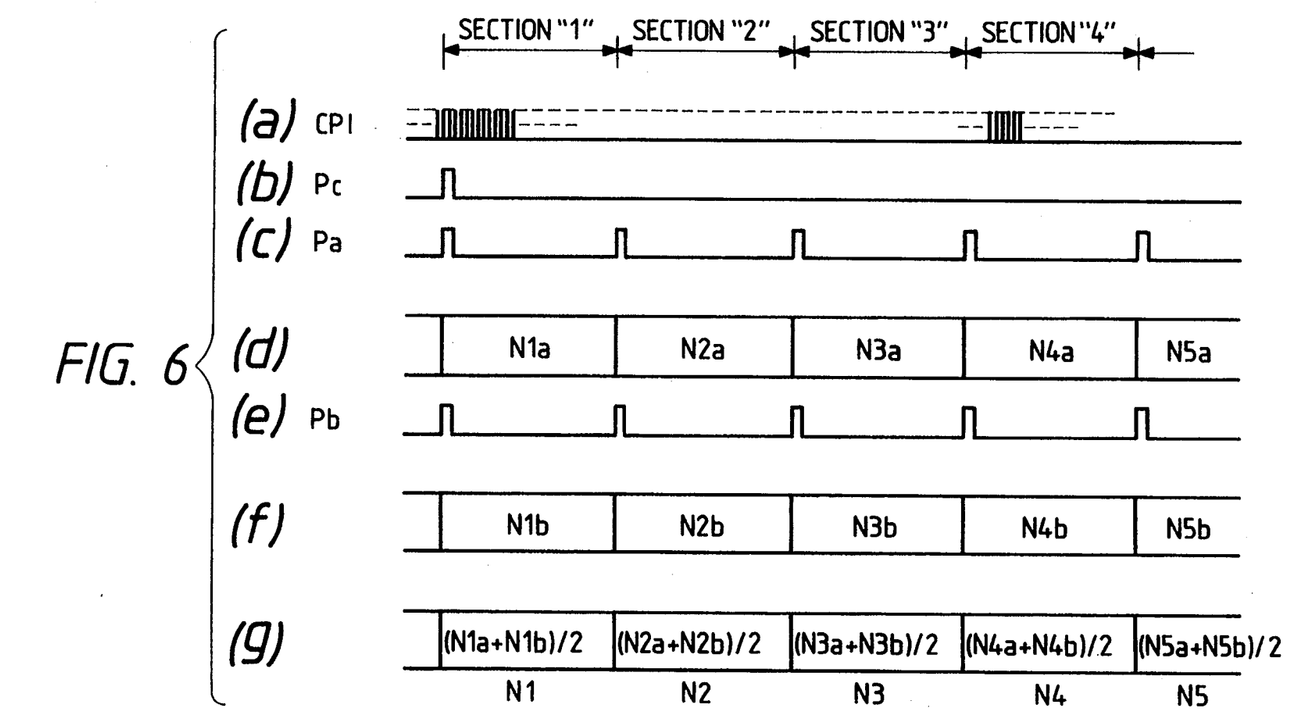
FIG. 6 is a timing chart showing an operation of detecting angular velocity of the photoreceptor drum in the rotary body drive apparatus of FIG. 4.

The rotation of the motor 15 is transmitted to the photoreceptor drum 1 via the drive gears 16–19 to rotate the drum 1. Being connected to the rotary shaft 20 of the photoreceptor drum 1, the rotary encoder 21 rotates accordingly. The pulses Pa and Pb (see FIGS. 6(c) and 6(e)), which are output from the respective sensor modules 21a and 21b of the rotary encoder 21 at a rate of 360 pulses per one rotation, are supplied to respective input terminals A and B of the CPU 23. The pulses Pc (see FIG. 6(b)), which are output from the sensor module 21c at a rate of one pulse per one rotation, are supplied to an input terminal C of the CPU 23.

Figure 7:
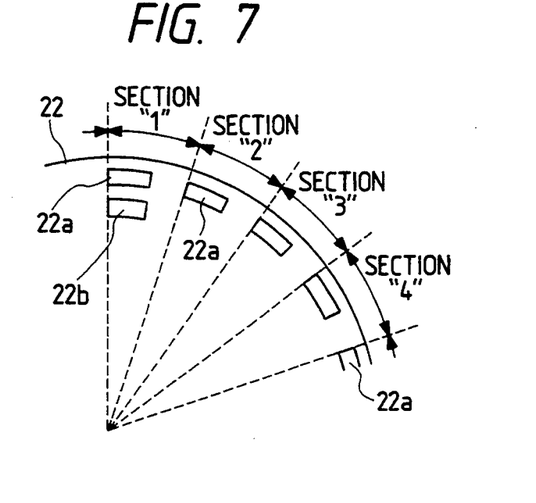
FIG. 7 illustrates divided sections of the rotary encoder in an embodiment of the invention.

The CPU 23 receives, from the clock oscillator 25, the clock pulses CP1 (see FIG. 6(a)) having a frequency sufficiently higher than that of the pulses Pa and Pb sent from the sensor modules 21a and 21b, and counts the received pulses CP1 existing in each cycle of the pulses Pa and Pb. In this embodiment, as shown in FIG. 7, the metal code wheel 22 of the rotary encoder 21 is divided in the circumferential direction into a plurality of sections that correspond to the respective angular velocity detecting windows 22a. Basically, the metal code wheel 22 is divided into 360 sections (section "1" to section "360") in one-to-one correspondence with the angular velocity detecting windows 22a. The number N of division of the sections is not limited to 360, but can be switched by multiplying or dividing the number of pulses output from the rotary encoder 21. To facilitate the understanding, in FIG. 7 the respective sections are exaggerated in the circumferential direction. The CPU 23 counts the clock pulses CP1 for the respective sections. FIG. 6(d) schematically shows count values N1a, N2a, N3a, N4a, . . . counted in the time intervals of the respective sections "1," "2," "3," "4," . . . measured based on the pulses Pa from the sensor module 21a. Similarly, FIG. 6(f) schematically shows count values N1b, N2b, N3b, N4b, . . . counted in the time intervals of the respective sections "1," "2," "3," "4," . . . measured based on the pulses Pb from the sensor module 21b.

Then, the CPU 23 adds together, for each section, a count value Nia (i=1, 2, 3, . . . , 360) that is based on the pulse Pa from the sensor module 21a and a count value Nib that is based on the pulse Pb from the sensor module 21b, and divides the added value by two to determine a count value Ni (=((Nia+Nib)/2) for each section (see FIG. 6(g)). The CPU 23 sequentially writes the respective count values N1, N2, N3, N4, . . . to a first table T1 that is set in the RAM 26. These count values N1, N2, N3, N4, . . . do not include the detection error of the rotary encoder 21.

Figure 8A:
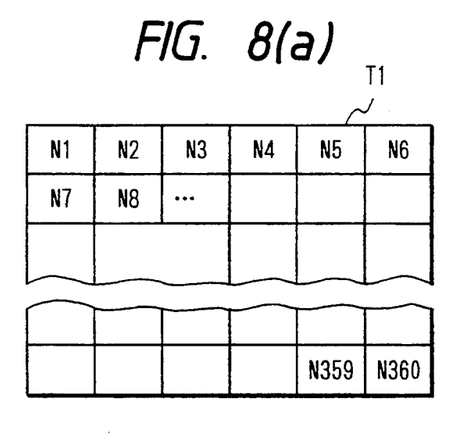
FIG. 8(a) shows a first table in which count values for the respective sections are stored.
Figure 8B:
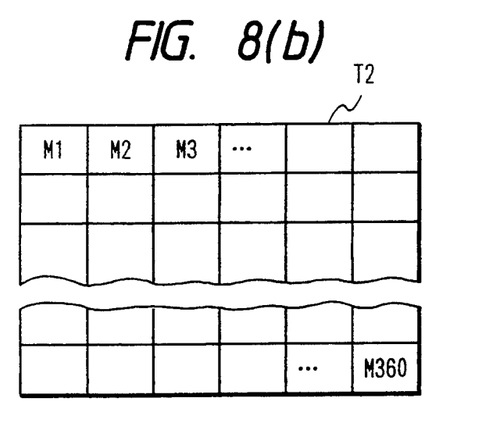
FIG. 8(b) shows a second table in which an average of the count values for the consecutive sections is stored.

Then, the CPU 23 repeatedly calculates an average of a plurality of, e.g., three, count values Ni of consecutive sections, and sequentially writes the calculated averages to a second table T2 that is set in the RAM 26 (see FIG. 8(b)). More specifically, first an average M1=(N1+N2+N3)/3 is calculated and written at the head of the second table T2 as an average M1. Then, an average M2=(N2+N3+N4)/3 is calculated and written to the position next to the position of M1. The writing to the second table T2 is effected after the writing to the first table T1. This averaging operation over three sections is performed to eliminate high-frequency components, and the cut-off frequency is lower when the number of sections is larger. The average obtained by the above type of calculation (averaging is performed over the sections that are progressively changed) is called a "running average." The invention is not limited to the above case where the sections for the averaging progress one by one.

Then, the CPU 23 calculates the angular velocity of the photoreceptor drum 1 based on a sum of the three consecutive average values, and determines a motor drive frequency $f_d$ for the next section. For example, assume here that the three consecutive average values are M1, M2 and M3, and that the count value for each section when the photoreceptor drum 1 is rotating at the regular velocity is Mr. If the photoreceptor drum 1 is rotating at the regular angular velocity, the sum (M1+M2+M3) of the count values for the three consecutive sections should be 3 Mr. If M1+M2+M3≠3Mr, which means that the photoreceptor drum 1 is not rotating at the regular angular velocity, the frequency $f_d$ of the motor drive pulses Pd, i.e., the number of drive pulses Pd in a predetermined period needs to be increased or decreased. In this embodiment, the rotation of the motor 15 is controlled so that pulses of {4 Mr−(M1+M2+M3)} are detected in the interval of the next section. For example, if (M1+M2+M3)<3 Mr, which means that the angular velocity of the photoreceptor drum 1 is faster than the regular velocity, the rotation of the motor 15 is slowed by decreasing the number of drive pulses Pd so that the number of pulses detected in the interval of the next section becomes 4 Mr−(M1+M2+M3). That is, the CPU 23 sends to the interval counter 27 such a control signal as reduces the frequency $f_d$ of the drive pulses Pd to a value corresponding to 4 Mr−(M1+M2+M3). The similar control is performed for the following sections. In the above manner, the rotation of the motor 15 is controlled so that the angular velocity of the photoreceptor drum 1 becomes equal to the regular velocity.

Now, using symbols $T_m$, $T_{(n)}$, $f_0$ and $\beta$ respectively representing the regular count value (corresponding to Mr mentioned above) for one section, 4 Mr−(M1+M2+M3), the standard frequency of the drive pulses Pd, and the feedback constant, the frequency $f_d$ of the drive pulses Pd is expressed as $$f_d = f_0 \left\{ 1 + \beta \left( \frac{T_m}{T_{(n)}} - 1 \right) \right\}. \tag{1}$$

Figure 9:
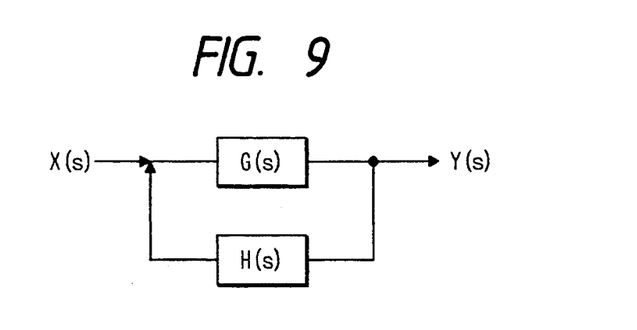
FIG. 9 is an automatic control block diagram of the rotary body drive apparatus of the invention.

The above-described rotation control system for the motor 15 is represented by an automatic control block diagram shown in FIG. 9, where X(s), Y(s) are an input and an output and G(s) and H(s) are forward and backward transfer functions of the control system. In the control system of FIG. 9, the following relationship holds:

$$\frac{Y(s)}{X(s)} = \frac{G(s)}{1 + G(s)H(s)} \tag{2}$$

Figure 10:
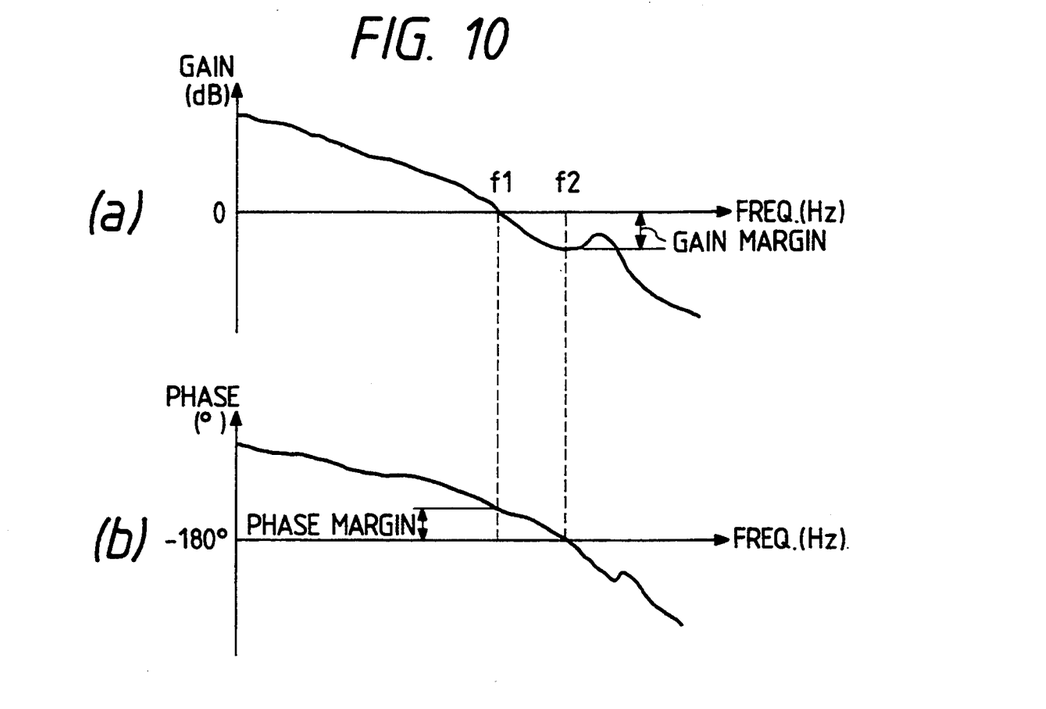
FIG. 10 is a Bode diagram showing transfer characteristics of the rotary body drive apparatus of the invention.
Figure 11:
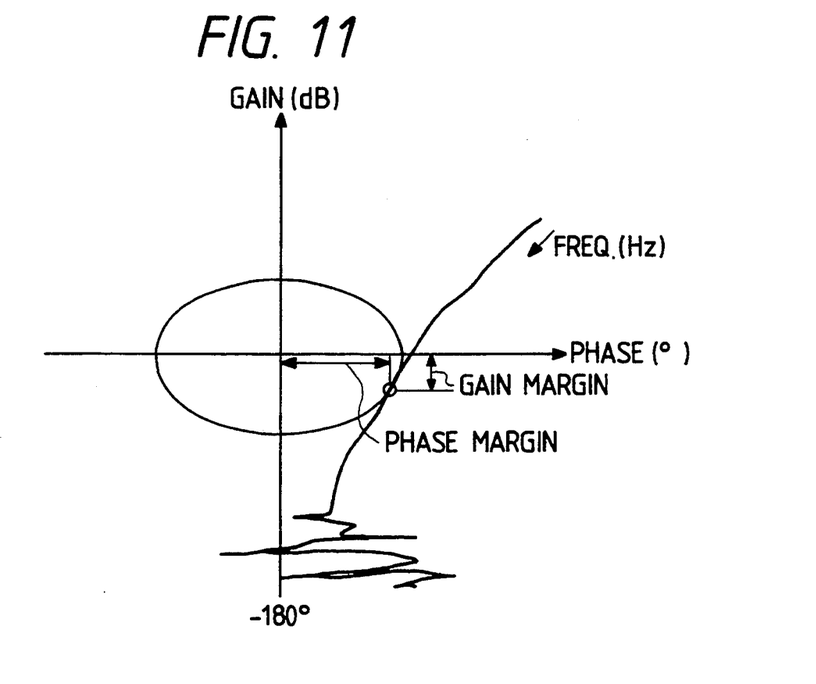
FIG. 11 is a Nichols chart showing the transfer characteristics of the rotary body drive apparatus of the invention.

In the above equation, the open-loop transfer function G(s)H(s) is expressed by a Bode diagram shown in FIG. 10. Part (a) of FIG. 10 is a gain-frequency diagram and part (b) is a phase-frequency diagram. To assure a stable operation in the automatic control system of the above type, it is necessary that there exist a sufficient phase margin at a frequency $f_1$ at which the gain is 0, and that there exist a sufficient gain margin at a frequency $f_2$ at which the phase is −180°. For example, in the case of fixed command control, the phase margin should be 20°-70° and the gain margin should be 3-10 dB. FIG. 11 is a Nichols chart of the same open-loop transfer function.

In the automatic control system as described above, the relationship between the standard frequency $f_0$ and the drive frequency $f_d$ for the motor 15 is expressed by Eq. (1).

In designing an automatic control system, it is natural that sufficiently large gain and phase margins be secured. Therefore, automatic control on an apparatus is performed without causing any problems at the start of its operation as long as the apparatus operates under the conditions similar to those assumed at the time of designing. In terms of the embodiment under consideration, the rotation of the motor 15 is controlled so that the photoreceptor drum 1 rotates at the regular angular velocity.

However, the characteristics of the power transmission system from the motor 15 to the photoreceptor drum 1 is not constant but may vary with variations of the environment or working conditions. It may be the case that the gain margin or phase margin becomes insufficient to prevent the normal automatic control operation.

Figure 12A:
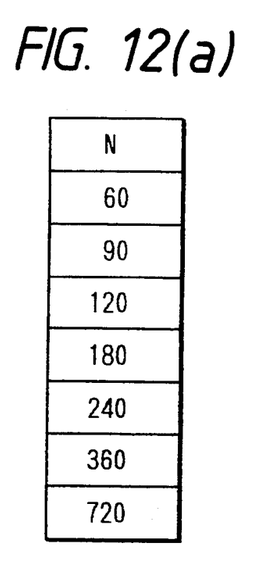
FIG. 12(a)–12(c) show look-up tables for storing values of control parameters.
Figure 12B:
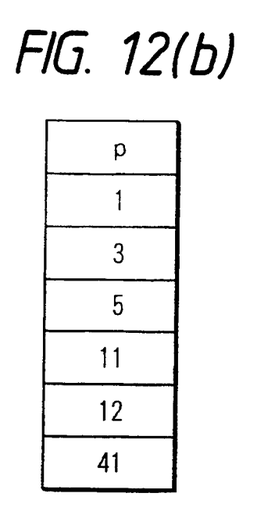
Figure 12C:
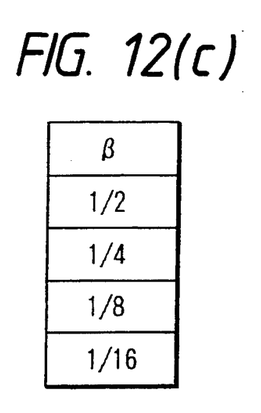
Figure 13A:
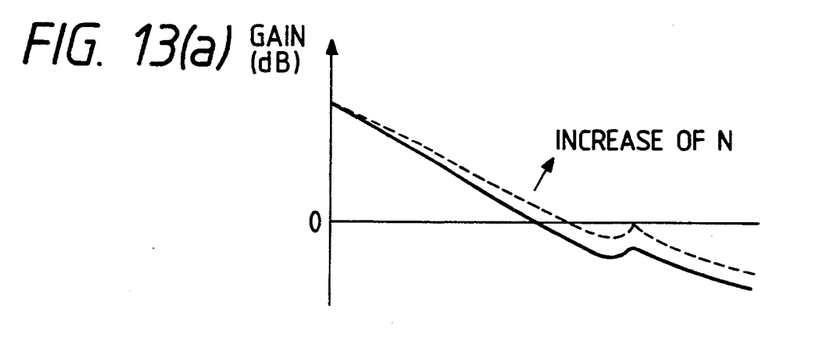
FIGS. 13(a) and 13(b) are graphs showing variations of the transfer characteristics when the number N of one-circle sections of the rotary encoder is switched.
Figure 13B:
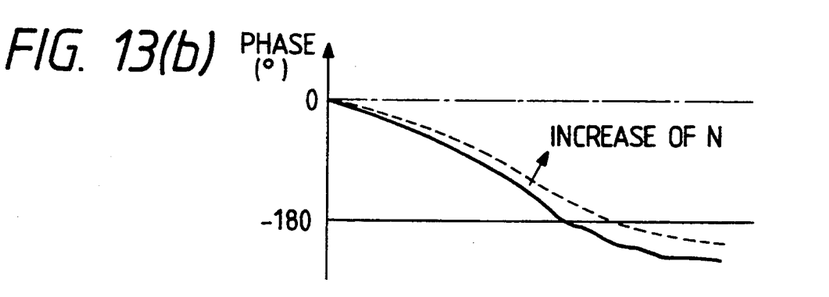
Figure 14A:
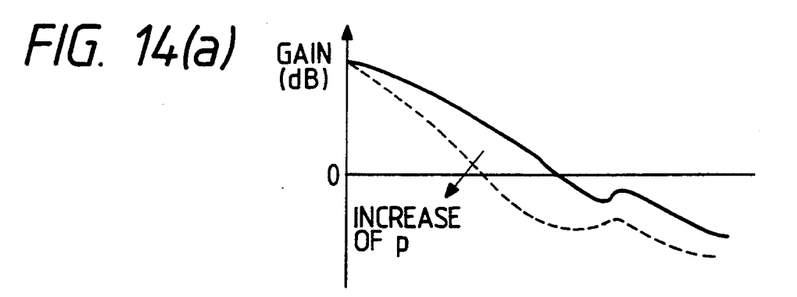
FIGS. 14(a) and 14(b) are graphs showing variations of the transfer characteristics when the number p of sections for an averaging operation is switched.
Figure 14B:
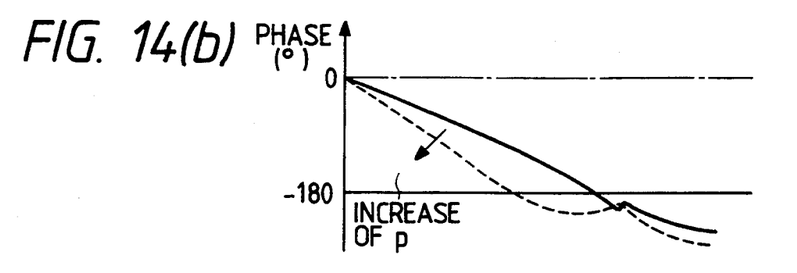
Figure 15A:
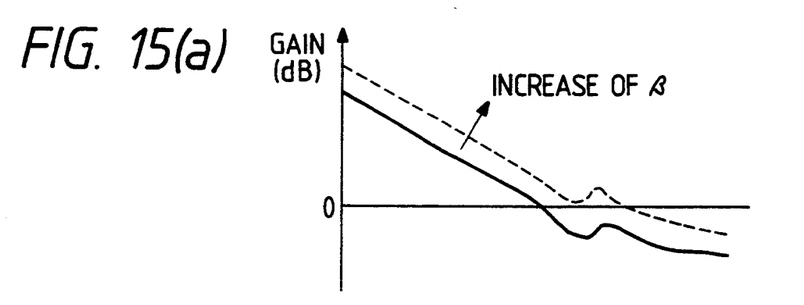
FIGS. 15(a) and 15(b) are graphs showing variations of the transfer characteristics when a feedback constant $\beta$ is switched.
Figure 15B:
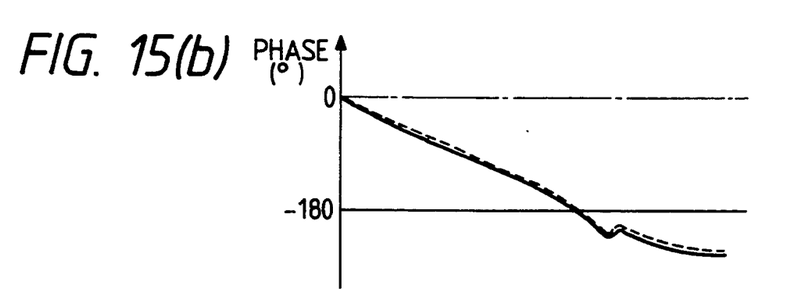

To solve the above problem, in this embodiment, the gain margin and phase margin of the control system are detected when necessary or at the start of the control. If the gain margin or phase margin is out of a predetermined regular range, the control parameters are switched for the automatic control to be always performed with sufficient gain and phase margins. More specifically, the three control parameters, i.e., the number N of one-circle sections of the encoder 21, the number p of sections over which the average is taken, and the feedback constant $\beta$ are switched in accordance with the operation state. As shown in FIGS. 12(a)-12(c), different values of the control parameters N, p and $\beta$ are entered in advance in look-up tables of the ROM 24.

The number N of sections is basically 360. But numbers 60-720 may be obtained for the number N by multiplying or dividing, by the CPU 23, the number of pulses Pa and Pb output from the rotary encoder 21 (see FIG. 12(a)). That is, the number 360, which is obtained by detecting rises of the pulses Pa and Pb that are output from the sensor modules 21a and 21b, may be halved to obtain 180, which may further be halved to obtain 90. A number 720 is obtained by detecting both of rises and falls of the pulses Pa and Pb of the sensor modules 21a and 21b. The number 720 may be divided by the CPU 23 into three to obtain 240, which may be halved to obtain 120, which may further be halved to obtain 60.

The number p is switched by the CPU 23 by specifying over what number of sections the count values of the first table T1 should be averaged, and what number of sections should be used as the unit in performing the rotation control based on the second table T2.

The value of $\beta$ may be switched when the CPU 23 performs a calculation according to Eq. (1).

The switching of the number N of sections corresponds to the change of the number of sampling times in the unit period. The switching of the number p corresponds to the change of the cut-off frequency of the filtering operation. The switching of $\beta$ corresponds to the change of the feedback amount. FIGS. 13(a)-13(b), 14(a)-14(b) and 15(a)-15(b) schematically show how the transfer characteristics of gain and phase are changed in accordance with the switching of the control parameters N, p and $\beta$, respectively.

Figure 16:
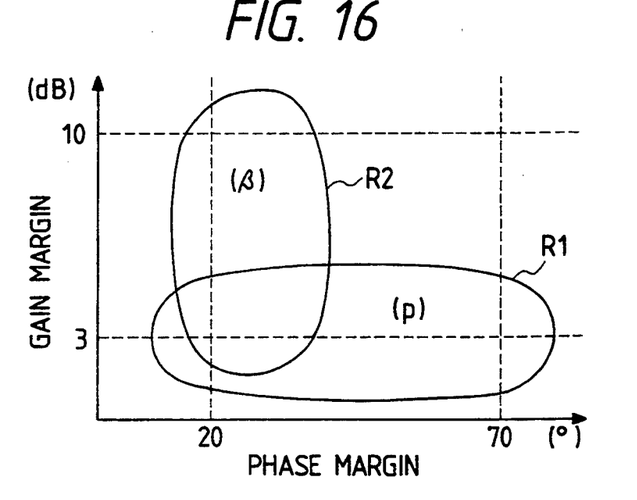
FIG. 16 is a graph showing a relationship between the control parameters and gain and phase margins.

FIG. 16 schematically shows variation ranges R1 and R2 of the gain and phase margins when the number p of sections and the feedback constant $\beta$ are switched, respectively. As is understood from FIG. 16, even if the gain or phase margin of the control system is decreased owing to environmental variations or long-term use, sufficient phase and gain margins can be secured by switching the number p of sections or the feedback constant $\beta$.

A description is made below of an operation of switching the control parameters by detecting the phase and gain margins.

At the start of the operation of the apparatus, the CPU 23 determines, automatically or in response to a user's instruction, the open-loop transfer function G(s)H(s) of the control system and calculates the gain and phase margins based on the open-loop transfer function thus determined. Then, the CPU 23 judges whether the gain and phase margins are within the predetermined regular ranges. In this embodiment, the regular range of the gain margin is 3-10 dB and the regular range of the phase margin is 20°-70°. If the gain or phase margin is out of the regular range, the CPU 23 switches the feedback constant $\beta$ and the number p of sections. More specifically, the CPU 23 switches the feedback constant $\beta$ and the number p of sections until the gain and phase margins get within the regular ranges while sequentially taking the feedback constant $\beta$ and the number p of sections from the look-up tables and making the apparatus operate.

Figure 17:
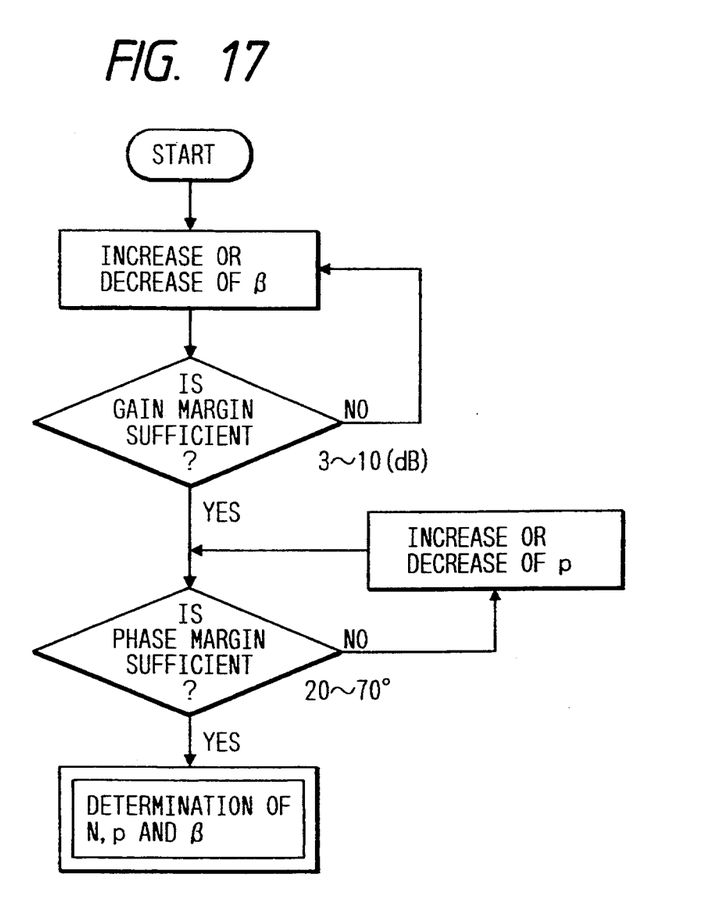
FIG. 17 is a flowchart of a process for switching the control parameters N, p and $\beta$ after calculating a transfer function.
Figure 18A:
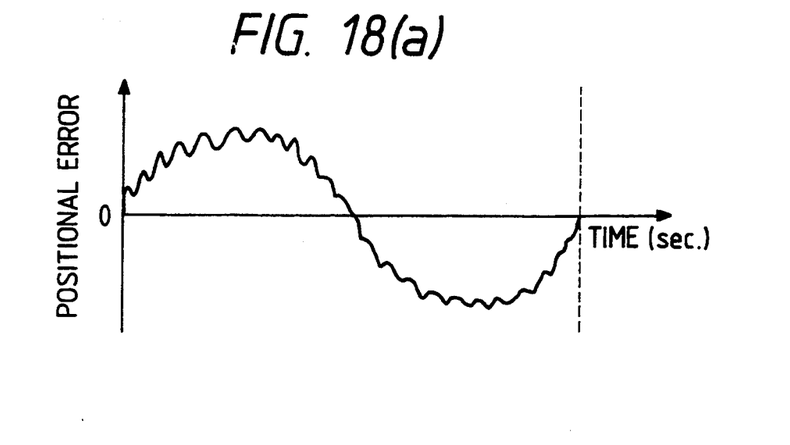
FIGS. 18(a) and 18(b) are waveform diagrams showing how the positional error of the photoreceptor drum is decreased according to the invention.
Figure 18B:
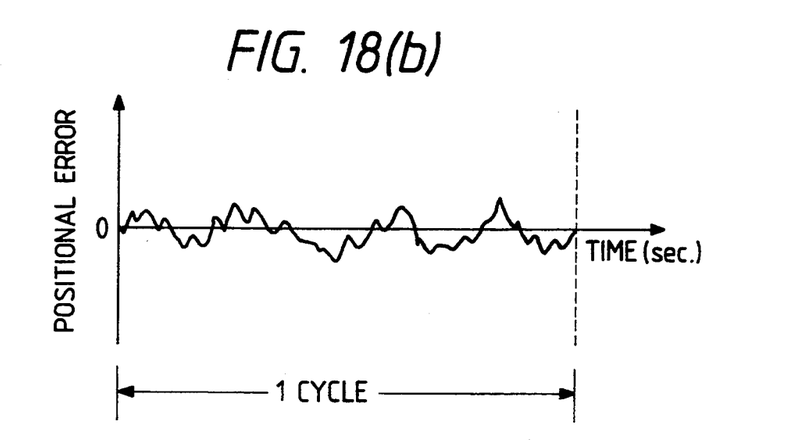

FIG. 17 is a flowchart showing a process of switching the control parameters N, p and $\beta$ after determining the transfer function. First the feedback constant $\beta$ is increased or decreased until sufficient gain margin is obtained, and then the number p of sections is increased or decreased until sufficient phase margin is obtained. It is assumed that N has already been determined.

Where the control parameters are fixed, the positional error of the photoreceptor drum 1 increases as shown in FIG. 18(a) when the transfer characteristics vary owing to long-term use etc. On the other hand, where the control parameters are switched adaptively in accordance with variations of the transfer characteristics as in the case of the embodiment, the positional error of the photoreceptor drum 1 can be kept small as shown in FIG. 18(b).

As described above, according to the invention, even when the transfer characteristics of the control system vary owing to long-term use, a temperature variation, etc., sufficient gain and phase margins can be secured by switching the control parameters. This allows the speed control of the rotary body to be always performed with high accuracy. As a result, it becomes possible to produce high-quality output images having no color registration error or nonuniformity in color.

What is claimed is:

1. An apparatus for controlling drive of a rotary body used in an image forming apparatus, comprising:
   a drive source for rotationally driving the rotary body;
   means for detecting an angular velocity of the rotary body;
   rotation control means for controlling an angular velocity of the drive source based on the detected angular velocity of the rotary body;
   means for determining a transfer function of the rotation control means;
   means for determining a gain margin and a phase margin from the transfer function; and
   means for changing a control parameter of the rotation control means when the gain margin or the phase margin is out of a predetermined range.

2. The apparatus of claim 1, wherein the control parameter is a feedback constant of the rotation control means.

3. The apparatus of claim 1, wherein the detecting means comprises a rotary encoder connected to a rotary shaft of the rotary body for generating a predetermined number of pulses per one rotation of the rotary shaft, and the rotation control means sequentially detects the angular velocity of the rotary body for each of one-circle sections of the rotary encoder divided in its circumferential direction in accordance with the predetermined number, progressively calculates a running average of the angular velocities of the rotary body over a plurality of consecutive ones of the sections, and controls the angular velocity of the drive source based on the calculated running average, and wherein the control parameter is a number of the consecutive sections.

4. The apparatus of claim 1, wherein the detecting means comprises a rotary encoder connected to a rotary shaft of the rotary body for generating a predetermined number of pulses per one rotation of the rotary shaft, and the rotation control means sequentially detects the angular velocity of the rotary body in a time interval corresponding to each of one-circle sections of the rotary encoder divided in its circumferential direction, the time interval being obtained by multiplying or dividing the predetermined number of pulses, progressively calculates a running average of the angular velocities of the rotary body over a plurality of consecutive ones of the sections, and controls the angular velocity of the drive source based on the calculated running average, and wherein the control parameter is a number of the one-circle sections.

5. The apparatus of claim 1, wherein the rotation control means comprises means for storing a plurality of values of the control parameter, and means for selecting one of the values as the control parameter to be used for controlling the angular velocity of the rotary drive source.

6. The apparatus of claim 1, wherein the transfer function of the rotation control means includes inertia, rigidity and viscoelastic attenuation.

* * * * *